United States Patent [19]

Hoashi et al.

[11] Patent Number: 4,939,656
[45] Date of Patent: Jul. 3, 1990

[54] CONTROL SYSTEM FOR EXCESSIVE SLIP PREVENTION ON STARTING AND ACCELERATION OF MOTOR VEHICLE

[75] Inventors: Yoshiaki Hoashi, Kariya; Mamoru Shimamoto, Nagoya, both of Japan

[73] Assignee: Nippondenso Co., Ltd., Kariya, Japan

[21] Appl. No.: 200,896

[22] Filed: Jun. 1, 1988

[30] Foreign Application Priority Data

Jun. 1, 1987 [JP] Japan .................. 62-138034

[51] Int. Cl.⁵ .................................. B60T 8/32
[52] U.S. Cl. ........................ 364/426.02; 180/197; 303/97; 303/106
[58] Field of Search ............ 364/426.02, 426.03; 180/197; 361/238; 303/95, 96, 100, 106

[56] References Cited

U.S. PATENT DOCUMENTS

| | | | |
|---|---|---|---|
| 4,685,547 | 8/1987 | Ohashi et al. | 180/197 |
| 4,721,176 | 1/1988 | Kabasin et al. | 180/197 |
| 4,739,856 | 4/1988 | Inagaki et al. | 180/197 |
| 4,762,196 | 8/1988 | Harada et al. | 180/197 |
| 4,765,430 | 8/1988 | Schulze et al. | 180/197 |
| 4,766,972 | 8/1988 | Takata et al. | 180/197 |
| 4,768,608 | 9/1988 | Hrovat | 180/197 |

*Primary Examiner*—Gary Chin
*Attorney, Agent, or Firm*—Cushman, Darby & Cushman

[57] ABSTRACT

A wheel slip control apparatus for prevention of excessive wheel-slip on acceleration of a vehicle, which includes an engine-output regulating actuator and a braking force regulating actuator. The wheel slip control apparatus comprises a braking force control unit coupled to the braking force regulating actuator and an engine output control unit coupled to the engine-output regulating actuator, which operate in response to the detection of the acceleration-slip occurring with respect to the driven-wheel. The braking force control unit calculates a reference control value of a braking force to be applied to the driven-wheel on the basis of a parameter representing a state of the driven-wheel so as to suppress the acceleration-slip and generates a brake control signal indicative of the calculated braking-force reference control value. Meanwhile, the engine-output control unit is responsive to the brake control signal therefrom to calculate an engine output control amount on the basis of the braking-force reference control value and to supply an engine-output control signal indicative of the calculated engine output control amount to the engine-output regulating actuator so as to decrease the engine output by a value corresponding to the calculated braking-force reference control value.

14 Claims, 12 Drawing Sheets

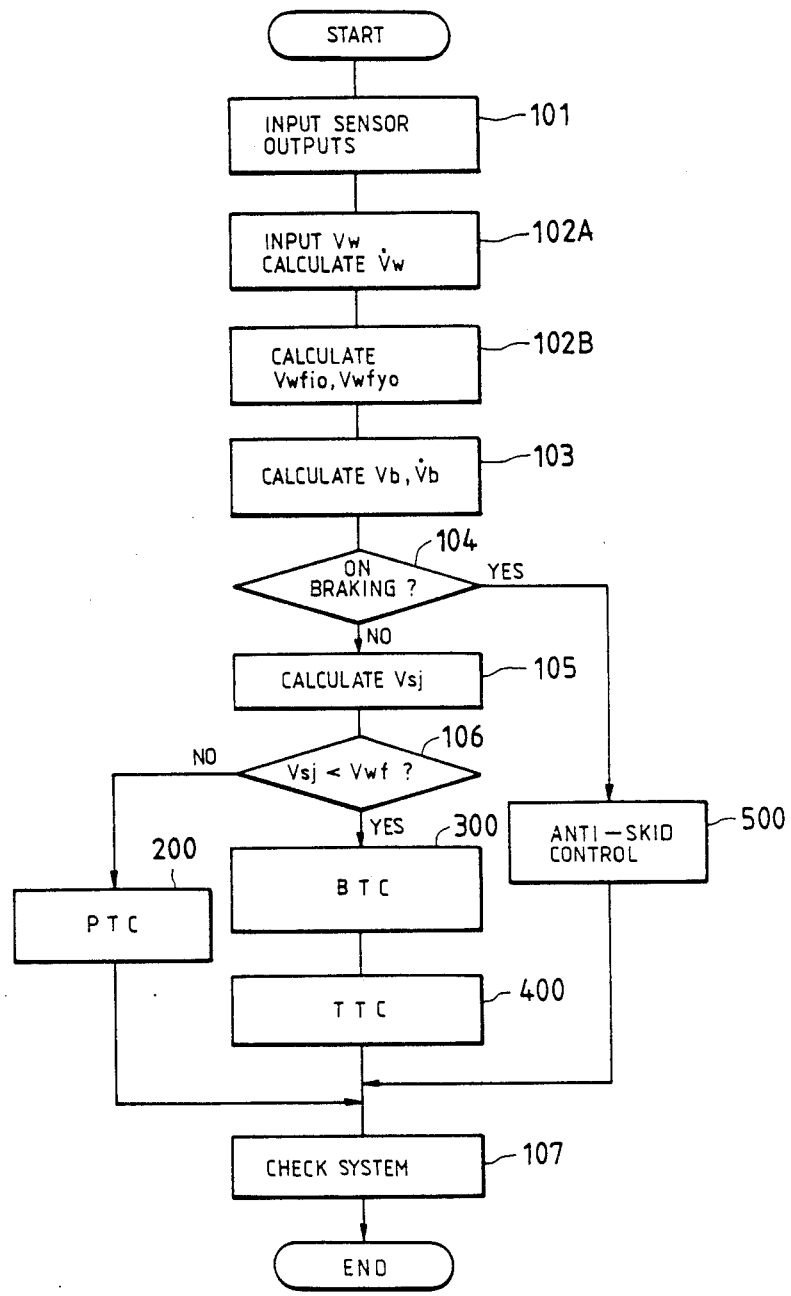

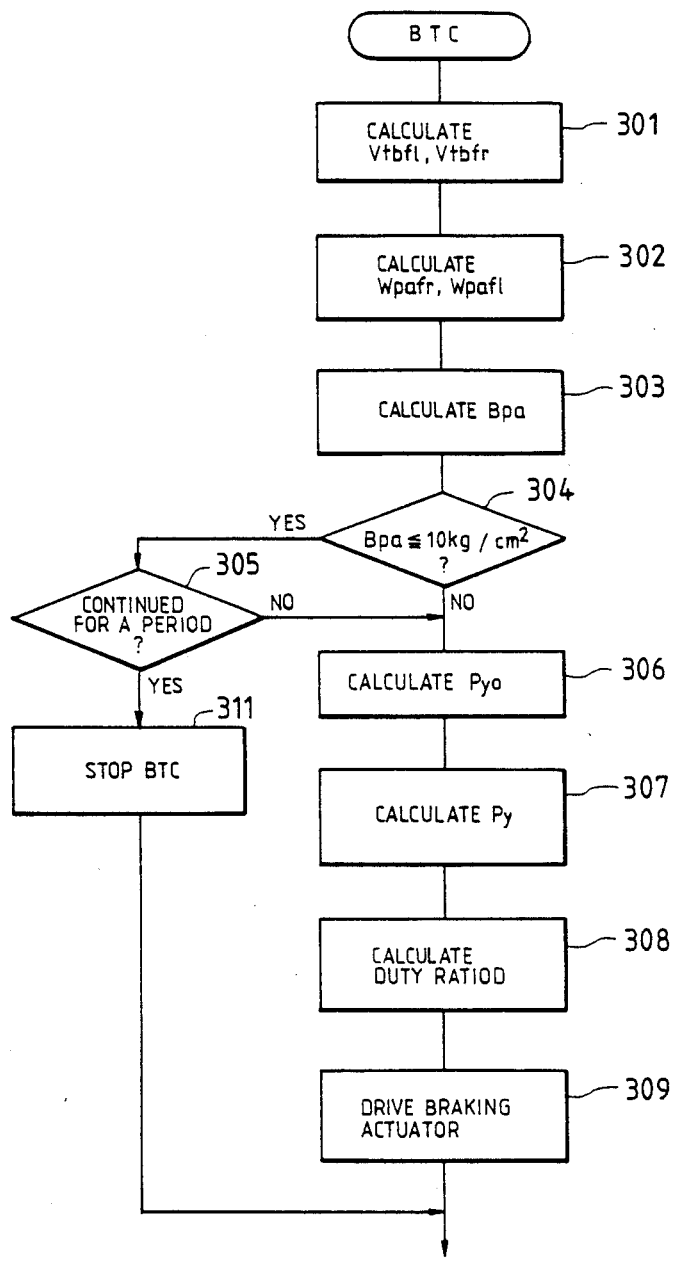

CONTROL SYSTEM FOR EXCESSIVE SLIP PREVENTION ON STARTING AND ACCELERATION OF MOTOR VEHICLE

BACKGROUND OF THE INVENTION

The present invention relates generally to a slip control apparatus for use in motor vehicles, and more particularly to a control system for preventing excessive slip from occurring during starting and acceleration of the motor vehicle.

One example of such a control system is shown in Japanese Patent Provisional Publication No. 61-108040 and is so constructed that the rotational speed and rotational acceleration of a driven wheel of the motor vehicle are respectively compared with upper limits and lower limits for detection of an acceleration slip of the driven wheel during starting and/or acceleration of the motor vehicle so that driven-wheel acceleration slip is prevented by independently controlling a throttle valve of the internal combustion engine and a braking device of an anti-skid control system employed for the motor vehicle.

Generally, for quickly suppressing the initial wheel acceleration slip, the braking control tends to be more effective as compared with the throttle valve control because of the response time lag of the internal combustion engine and the associated drive-force transmission system. Thus, the simultaneous independent control of the braking device and the throttle valve may result in generation of an excessive engine torque due to the delay of the throttle valve control with respect to the braking control. In addition, the prior system starts the slip prevention control only after the detection of occurrance of the acceleration slip and therefore a further problem arises with such a prior system in that difficulty is encountered in preventing the wheel from racing at the initial time of starting and/or acceleration of the motor vehicle. This can decrease the road surface friction coefficient to make starting the motor vehicle impossible. Furthermore, a further important problem in such a prior system relates to malfunction of the system on turning of the vehicle. That is, during turning, the wheels are driven at different speeds from each other and the driven wheel can rotate at a higher speed as compared with the non-driven wheel. In this case, there is the possibility that the system falls into an error in terms of detection of the occurrence of the acceleration slip.

SUMMARY OF THE INVENTION

The present invention has been developed in order to eliminate the drawbacks inherent to the conventional slip control system.

It is therefore an object of the present invention to provide a slip control system which is capable of smoothly starting and accelerating of a motor vehicle by quickly and surely supressing the excessive engine output on racing at the initial time.

A feature of the present invention involves controlling the engine in connection with the braking condition of a braking system of the motor vehicle in response to occurrance of acceleration-slip to remove an excessive engine output so as to suppress the acceleration-slip. That is, a wheel slip control apparatus for prevention of excessive wheel-slip on acceleration of a vehicle according to the present invention comprises a braking force control unit coupled to a braking force regulating actuator for operating a braking system to regulate the braking force to be applied to at least one driven-wheel and an engine output control unit coupled to the engine-output regulating actuator for operating a throttle valve, for example, to regulate the engine output In response to the acceleration-slip occurring with respect to the driven-wheel, the braking force control unit calculates a reference control value of a braking force to be applied to the driven-wheel on the basis of a parameter representing a state of the driven-wheel and generates a brake control signal indicative of the calculated braking-force reference control value. Meanwhile, the engine-output control unit is responsive to the brake control signal therefrom to calculate an engine output control amount on the basis of the braking-force reference control value and to supply an engine-output control signal indicative of the calculated engine output control amount to the engine-output regulating actuator so as to decrease the engine output by a value corresponding to the calculated braking-force reference control value.

BRIEF DESCRIPTION OF THE DRAWINGS

The object and features of the present invention will become more readily apparent from the following detailed description of the preferred embodiments taken in conjunction with the accompanying drawings in which:

FIG. 4 is a flow chart showing a main routine of an execution of the slip control of this embodiment;

FIG. 6 is a flow chart showing the processes of a braking traction control;

DETAILED DESCRIPTION OF THE INVENTION

Figure 1:
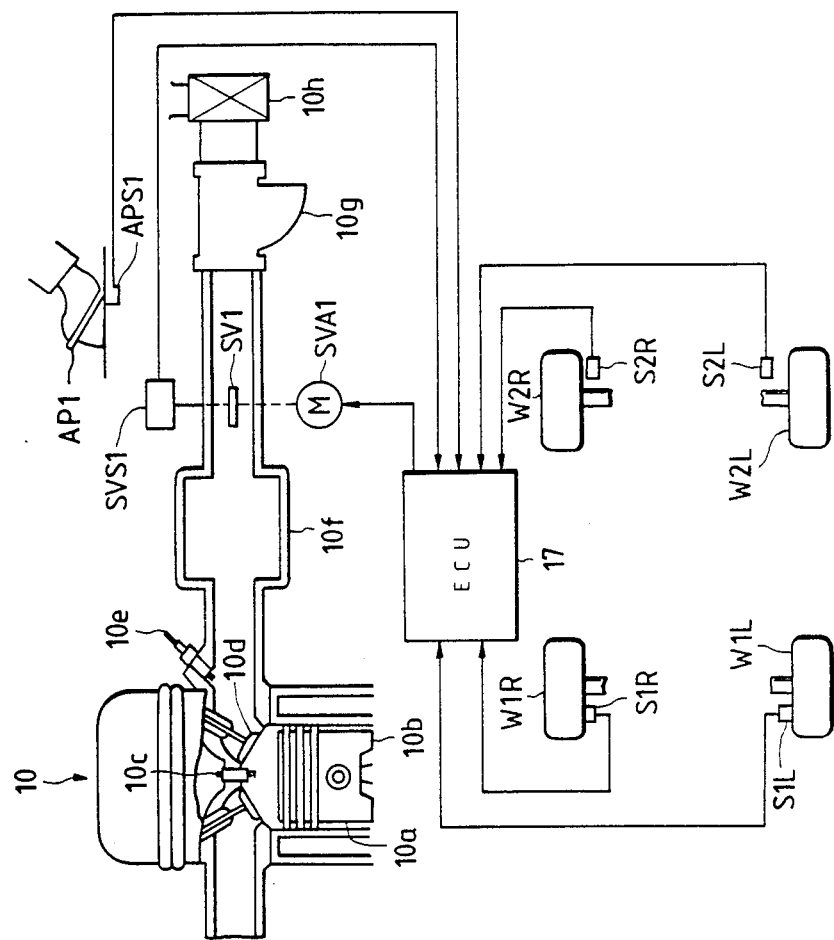
FIG. 1 is an illustration of an engine output control section of a slip control apparatus according to an embodiment of the present invention.

Referring now to FIG. 1, there is principally illustrated an engine output control section of a slip control apparatus incorporated into a motor vehicle which is of the front-wheel driving type, where the front wheels are illustrated by characters W1L, W1R and the rear wheels are designated by characters W2L, W2R. In FIG. 1, illustrated at numeral 10 is an internal combustion engine comprising a cylinder 10a, a piston 10b, an ignition plug 10c, an air-intake valve 10d, a fuel injection valve 10e, a surge tank 10f, an air-flow meter 10g and an air cleaner 10h. In an air passage between the air-flow meter 10g and the surge tank 10f is provided a throttle valve SV1 which is operatively coupled to an accelerating pedal AP1 for regulating the air-intake amount into the engine 10. The accelerating pedal AP1 is associated with an operation sensor APS1 for detecting the amount of depression of the accelerating pedal AP1. Furthermore, the throttle valve SV1 is provided with a throttle sensor SVS1 for detecting the degree of opening of the throttle valve SV1 and is coupled through a throttle actuator SVA1 to an electronic control unit (ECU) 17 so that the throttle actuator SVA1 drives the throttle valve SV1 in accordance with a command signal from the electronic control unit which may be composed of a microcomputer including a central processing unit (CUP) 17a, a read-only memory (ROM) 17b, a random access memory (RAM) 17c and so on (see FIG. 2). Also provided in this system are wheel speed sensors S1L, S1R, S2L and S2R which are respectively connected with the front-left wheel W1L, front-right wheel W1R, rear-left wheel W2L and rear-right wheel W2R so as to detect the rotational speed of the corresponding wheel. The output signals indicative of the rotational speeds from the wheel speed sensors S1L to S2R are supplied respectively to the electronic control unit 17.

Figure 2:
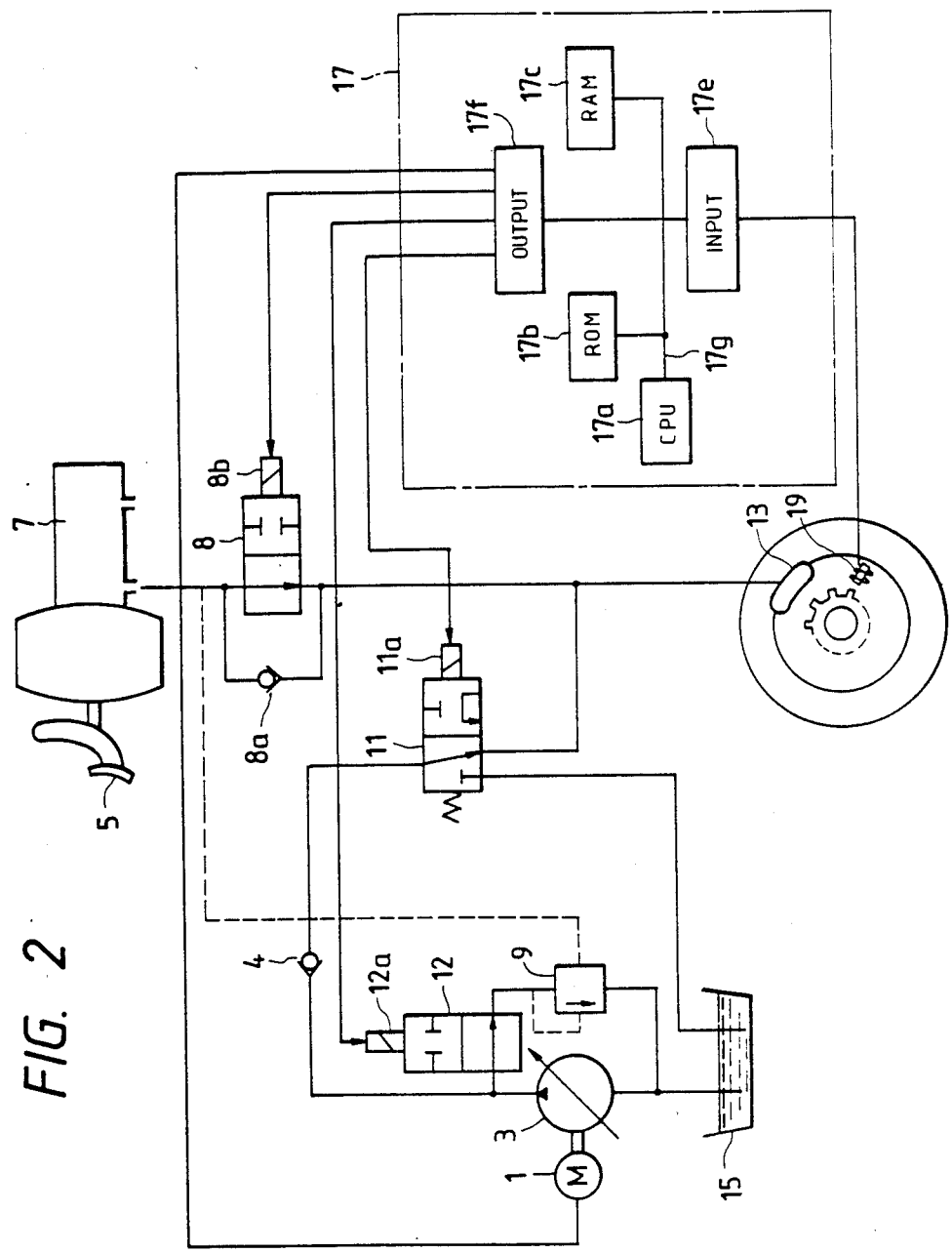
FIG. 2 is an illustration of a braking force control section of the slip control apparatus of this invention.

FIG. 2 mainly shows a braking force control section of the slip control apparatus of this embodiment which is adapted to regulate the hydraulic pressures to be applied to the wheels W1L to W2R. The braking force control section is arranged so as to perform anti-skid control for prevention of the wheel slip on braking operation of the motor vehicle and further to perform so-called traction control for prevention of the wheel slip on starting and/or acceleration of the motor vehicle. That is, the anti-skid control can be effected with a cut-off valve 12 being set to the opening condition, and, on the other hand, the traction control can be performed in response to the cut-off valve 12 being set to the closed condition.

In FIG. 2, between the inlet and the outlet of a hydraulic pressure pump 3 driven by a motor 1 is provided a change-over valve 9 which is adapted to be switched from the opening state (communicating condition) to the closed state (shut-off condition) and kept thereto by means of a hydraulic pressure from a master cylinder 7 on depression of a braking pedal 5, so that the pump pressure follows the master cylinder pressure. On the other hand, on the traction control, the cut-off valve 12 is energized to cut off the hydraulic pressure circuit of the change-over valve 9 so that the hydraulic pressure discharged from the pump 3 becomes independent from the hydraulic pressure from the master cylinder 7.

The outlet of the pump 3 is coupled through a check valve 4 and a three-port and two-position solenoid valve 11 to a wheel cylinder 13 for applying a braking force to the corresponding wheel. The wheel cylinder 13 and the master cylinder are coupled to each other through a cut-off valve 8 and a return check valve 8a which are provided in parallel to each other. The two-position solenoid valve 11 is arranged so that on deenergization the outlet of the pump 3 and the wheel cylinder 13 are kept to be communicated with each other and in response to energization the wheel cylinder 13 and a reservoir 15 are maintained to be communicated with each other. Here, in this embodiment, the cut-off valves 8, 12 and the two-position solenoid valve 11 act as a braking actuator for performing the braking operation under control of the electronic control unit 17.

In the above-mentioned hydraulic pressure system, the system from the reservoir 15 through the pump 3, check valve 4 and two-position solenoid valve 11 to the wheel cylinder 13 is for an increase in the braking hydraulic pressure and the system from the wheel cylinder 13 through the two-position solenoid valve 11 to the reservoir 15 is for a decrease in the braking pressure. The switching between pressure increase and the pressure decrease is performed by the two-position solenoid valve 11. In the drawing, numeral 19 represents a rotational speed sensor corresponding to one of the wheel sensors S1L and S1R associated with the driven wheels W1L and W1R.

Figure 3:
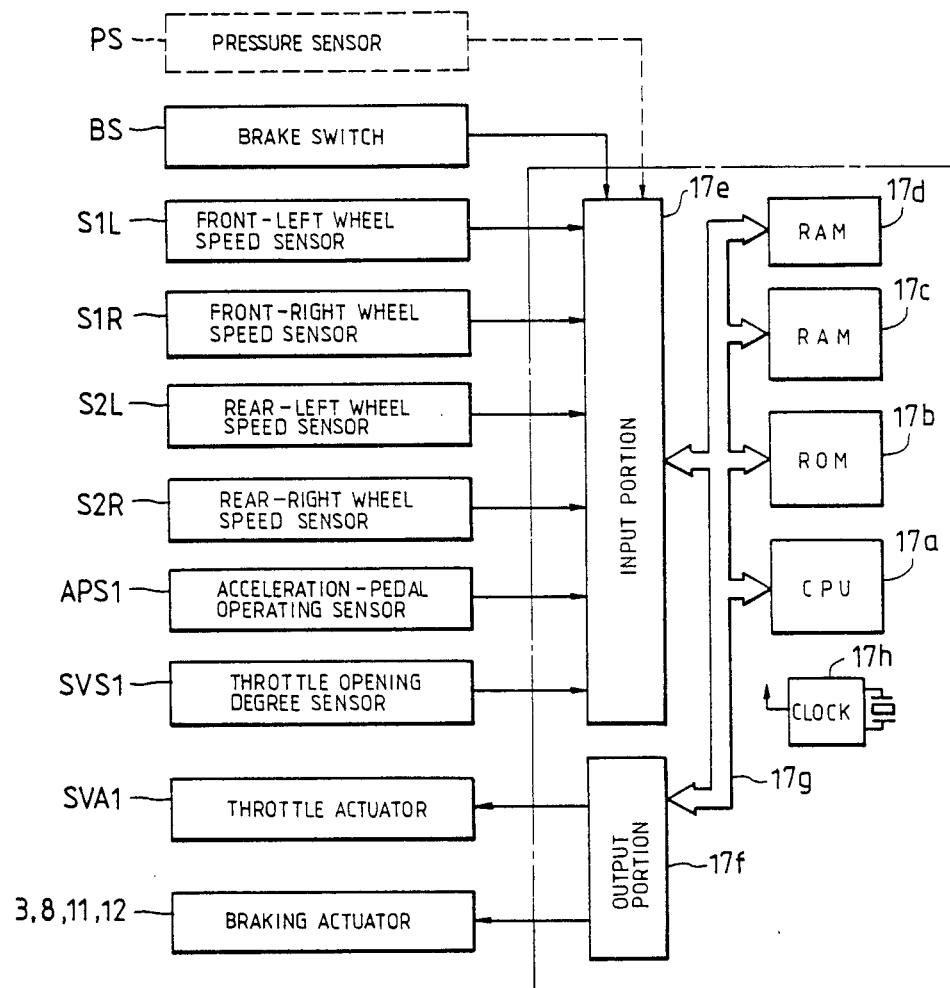
FIG. 3 shows a detailed arrangement of an electronic control unit used in this embodiment.

FIG. 3 is a more detailed illustration of the electronic control unit (ECU) 17. In FIG. 3, the CPU 17a is coupled through an input portion 17e to the various sensors, i.e., the wheel speed sensors S1L to S2R, the operation sensor APS1, the throttle sensor SVS1, a brake lamp switch BS and a brake pressure sensor PS (if required), to perform the processes for control of the throttle actuator SVA1 and the braking actuator (3, 8, 11, 12) on the basis of the input signals from the various sensors in accordance with predetermined control programs. The input portion 17e has a multiplexer for selectively outputting the signals from the various sensors and an analog-to-digital (A/D) converter for converting analog signals into corresponding digital signals. The CPU 17a is connected through a common bus 17g to its associated units such as the ROM 17b for storing the control programs and data for the control processing and the RAM 17c for temporarily storing the data from the various sensors and other data necessary for the processing. Also included in the associated units is a backup random access memory 17d which is adapted to keep necessary data irrespective of the turning off of a key switch of the motor vehicle. The control signals from the CPU 17a are supplied to an output portion 17f which in turn drives the throttle actuator SVA1 and the braking actuator (3, 8, 11, 12). Illustrated at reference 17h is a clock circuit for generating a clock signal as control timing signal at a predetermined interval. That is, the electronic control unit 17 detects the slip states of the driven wheels W1L and W1R on the basis of the wheel speed data from the wheel speed sensors S1L to S2R and further detects the acceleration-pedal operating amount and throttle opening degree by the operation sensor APS1 and throttle sensor SVS1. The electronic control unit 17 controls the opening degree of the throttle valve SV1 and the braking hydraulic pressure to the wheel in accordance with the detected wheel slip state so as to prevent the wheel slip.

FIG. 4 illustrates a main routine for the wheel slip prevention control, executed by the electronic control unit 17. This main routine is repeatedly executed at a predetermined interval.

The main routine starts with a step 101 to receive a signal indicative of a throttle opening degree $\theta t$ from the throttle sensor SVS1, a signal indicative of an acceleration-pedal depressing amount $\theta p$ from the operation sensor APS1 and a signal from the brake lamp switch BS. Following the step 101, a step 102A is executed to obtain the wheel speed Vw of wheel acceleration $\dot{V}w$ of each wheel on the basis of the outputs of the left and right driven-wheel sensors S1L, S1R and left and right non-driven-wheel sensors S2L, S2R. A subsequent step 102B is executed to calculate left and right driven-wheel speeds Vwflo and Vwfro under the condition of no occurrence of slip on the basis of the left and right non-driven wheel speeds Vwrl and to Vwrr and calculate the average value Vwfo of the calculated left and right driven-wheel speeds Vwflo and Vwfro and the average value Vwf of the obtained left and right driven-wheel speeds Vwfl and Vwfr and to further calculate acceleration values $\dot{V}$wfo and $\dot{V}$wf on the basis of the average values Vwfo and Vwf.

Figure 13:
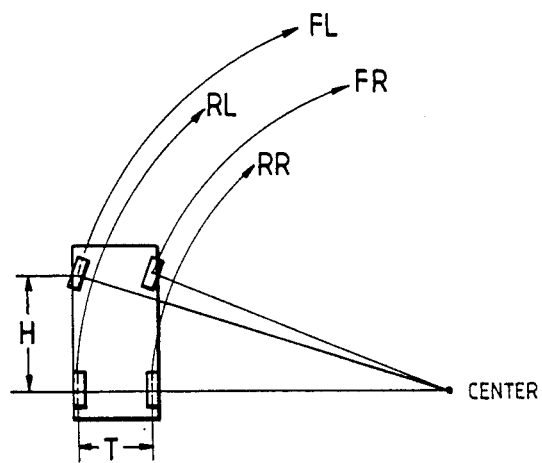
FIGS. 13 and 14 are illustrations for describing the calculation of driven-wheel speeds.

A description will be made hereinbelow in terms of a method of obtaining the left and right driven-wheel speeds Vwflo and Vwfro with reference to FIGS. 13 and 14. That is, if the motor vehicle is normally turned without occurrence of slipping, when the rotational speeds of two (for example, rear wheels) of the four wheels are known, the rotational speeds of the other two wheels (for example, front wheels) can be obtained thereby. In the case that the motor vehicle is turned in the right direction as shown in FIG. 13 (where references FR, FL RR and RL represent the front inner wheel, front outer wheel, rear inner wheel and rear outer wheel, respectively), the respective wheels are turned at the same angular velocity and the rotational speeds of the respective wheels are proportional to the turning radii of the respective wheels. Therefore, the relation between the speed Vwrl of the rear outer wheel RL and the speed Vwrr of the rear inner wheel RR can be expressed by the following equation (1-1):

$$\frac{Vwrl}{Vwrr} = \frac{R+T}{R} \qquad (1\text{-}1)$$

that is, $$R = \frac{Vwrr}{Vwrl - Vwrr} \cdot T \qquad (1\text{-}2)$$

where R is the turning radius of the rear inner wheel RR and T represents the tread.

As a result, it is possible to obtain the relative positions of five points, i.e., ground-contact points of the four wheels and the turning center point.

Figure 14:
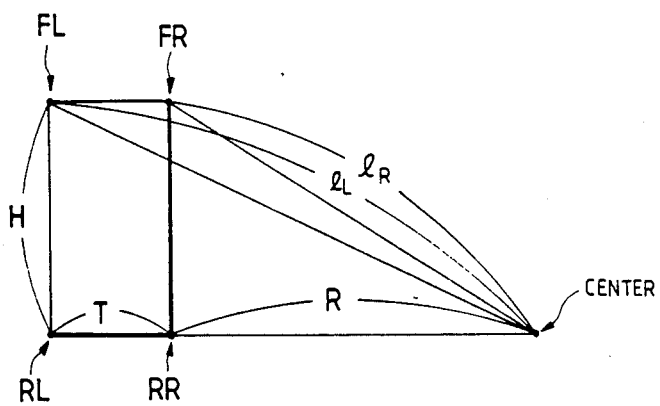

In FIG. 14, the values of a wheel base H and the tread T are known previously and therefore the turning radius $l_R$ of the front inner wheel FR and the turning radius $l_L$ of the front outer wheel FL can be obtained respectively as follows.

$$l_R = \sqrt{R^2 + H^2} \qquad (1\text{-}3)$$

$$l_L = \sqrt{(R+T)^2 + H^2} \qquad (1\text{-}4)$$

Thus, in the case of no slip, the speed Vwfro of the front inner wheel FR and the speed Vwflo of the front outer wheel FL can be obtained in accordance with the following equations.

$$Vwfro = \frac{\sqrt{R^2 + H^2}}{R} \cdot Vwrr \qquad (1\text{-}5)$$

$$Vwflo = \frac{\sqrt{(R+T)^2 + H^2}}{R+T} \cdot Vwrl \qquad (1\text{-}6)$$

The equations (1-5) and (1-6) can be rewritten as follows by using the equation (1-2).

$$Vwfro = \sqrt{Vwrr^2 + \frac{H^2}{T^2}(Vwrr - Vwrl)^2}$$

$$Vwflo = \sqrt{Vwrl^2 + \frac{H^2}{T^2}(Vwrr - Vwrl)^2}$$

From the above, it will be understood that even when the vehicle is in a turning state, the driven-wheel (front wheel) speeds (Vwflo, Vwfro) can be accurately derived as a function of the difference (Vwrr−Vwrl) in speed between of the non-driven wheels (rear wheels), i.e., with a correction based on the turning degree of the vehicle.

Returning back to FIG. 4, control advances to a step 103 to calculate the vehicle speed Vb and the vehicle acceleration $\dot{V}$b on the basis of the obtained wheel speed data. Here, on the traction control, the average speed of the two non-driven wheels is determined as the vehicle speed Vb and the vehicle acceleration $\dot{V}$b is obtained as variation of the vehicle speed Vb. The step 103 is followed by a decision step 104 so as to check whether the vehicle is in a braking state. If so, the program goes to a step 500 for execution of the anti-skid control. Otherwise, the program proceeds to steps for the traction control. The decision in terms of whether the vehicle is in the braking state is normally made in accordance with the signal from the braking lamp switch BS. However, taking into account a failure of the braking lamp switch BS, it is also appropriate that the decision is made under the conditions that the rotational speed of at least one wheel extremely decreases.

If the answer from step 104 is negative, a step 105 follows to calculate a slip decision reference speed Vsj which is used for checking whether or not the acceleration slip has occured. The slip decision reference speed Vsj may be calculated in accordance with the following equation:

Vsj=Ksj·½(Vwfro+Vwflo)+Vsjo where ½(Vwfro+Vwflo) represents the average value Vwfo of the left and right drive-wheel speeds Vwfro, Vwflo which are derived as a function of the left non-driven wheel speed Vwrl and the right non-driven wheel speed Vwrr under the condition of no slip, Ksj designates a constant which may be set to a value between 1.1 and 2.0, and Vsjo is a predetermined value (=1 to 20 km/h) which is added to prevent of erroroperation due to low-speed running of the motor vehicle and so on.

Figure 5A:
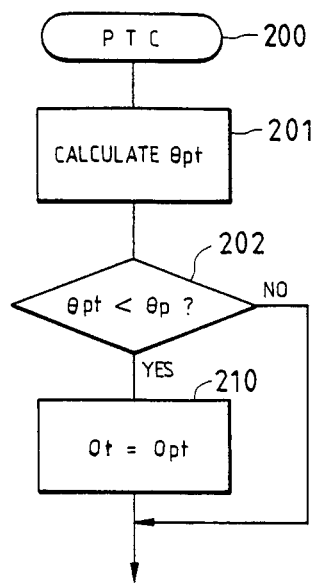
FIG. 5A is a flow chart showing a preventive traction control.
Figure 5B:
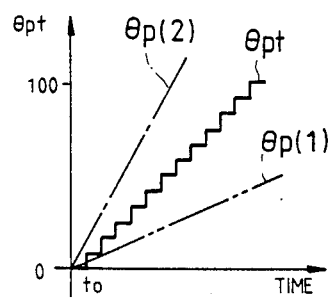
FIG. 5B is an illustration of a comparison between the target throttle opening degree and the acceleration-pedal operating amount.

The calculated slip decision reference speed Vsj is compared with the average value Vwf of the driven-wheel speeds Vwfl, Vwfr, obtained by means of the wheel sensors S1L and S1R, so as to determine the occurrence of the acceleration slip when Vsj>Vwf. In response to the occurrence of the acceleration slip, control goes to a step 200 for execution of the preventive traction control (PTC) which is illustrated in FIG. 5A. In FIG. 5A, a step 201 is initially executed in order to calculate a target throttle opening degree θpt. In this embodiment, the value of the target throttle opening degree θpt is set to be increased stepwise at a predetermined interval from the time of depression of the acceleration pedal AP1 up to 100% finally, thereby gradually increasing the driven-wheel torque. On the other hand, it is also appropriate that, with the driven-wheel torque being calculated on the basis of the engine speed, throttle opening degree and arrangement (gear ratio or the like) of the drive transmission system, the PTC target throttle opening degree $\theta pt$ is calculated so that the torque is slowly increased with the feedback technique. In a decision step 202, as shown in FIG. 5B, the PTC target throttle opening degree $\theta pt$ is compared with the acceleration-pedal operating amount $\theta p$. If, as indicated by $\theta p(1)$, a value corresponding to the acceleration-pedal operating amount $\theta p$ is below the PTC target throttle opening degree $\theta pt$, control advances to a step 107 in the main routine of FIG. 4 where the system checking is performed if required. On the other hand, if as indicated by $\theta p(2)$ a value corresponding to the acceleration-pedal operating amount $\theta p$ is above the PTC target throttle opening degree $\theta pt$, a step 210 follows to operate the throttle actuator SVA1 so that the throttle opening degree $\theta t$ becomes equal to the PTC target throttle opening degree $\theta pt$, followed by the step 107.

On the other hand, if the answer from step 106 in the FIG. 4 main routine is affirmative, control goes to a step 300 for execution of the brake traction control (BTC) and further to a step 400 for execution of the throttle traction control (TTC) which will be described hereinafter. FIG. 6 shows detailed operations for the brake traction control (BTC). A step 301 is initially executed so as to independently obtain left and right BTC target speeds Vtbfl and Vtbfr in accordance with the following equations using the left and right driven-wheel speeds Vwfro, Vwflo derived from the non-driven wheel speeds Vwrl, Vwrr under the condition of no slipping:

$$Vtbfr = Kb \cdot Vwfro + Vbo$$

$$Vtbfl = KB \cdot Vwflo + Vbo$$

where Kb represents a constant which may be set between 1.1 and 2.0 and Vbo is a predetermined speed (used as a safty factor) which may be determined to be 1 to 20 km/h.

A subsequent step 302 is executed to obtain parameters Wpafl, Wpafr representing the states of the left and right driven wheels. The parameters Wpafl, Wpafr are respectively obtained in accordance with the following equations as functions of the differences between the BTC target speeds Vtbfl, Vtbfr and the driven-wheel speed Vwfl, Vwfr and further the driven-wheel acceleration values $\dot{V}wfl$, $\dot{V}wfr$:

$$Wpafr = Vtbfr - Vwfr + Kw \cdot \dot{V}wfr$$

$$Wpafl = Vtbfl - Vwfl + Kw \cdot \dot{V}wfl$$

where kw represents a constant.

A step 303 follows to calculate a reference control hydraulic pressure Bpa which is used as a reference for the braking hydraulic pressures applied to the left and right wheels. The reference control hydraulic pressure Bpa, obtained in accordance with the following equation, is a value which is zero at the initial time and then increased and decreased in accordance with the wheel state parameter Wpa and the throttle opening degree $\theta t$.

$$Bpa(n) = Bpa(n-1) + X1 \cdot k1 \cdot (100 - \theta t) \tag{3-1}$$

where $X1 = k2 \cdot Bpa + k3$ and k1, k2 and k3 represent constants and Bpa (n−1) is the previously calculated value. Here, Bpa is not varied in the stable state that the drive wheel speed is equal to the BTC target speed, i.e., under the conditions that Wpa=0 and $\theta t = 100\%$. Bpa slowly increases as the slip advances in the increasing direction and slowly decreases as the slip advances in the decreasing direction or as the throttle opening degree $\theta t$ decreases. The actual braking hydraulic pressure is controlled with respect to Bpa, and as a result Bpa follows a hydraulic pressure value (corresponding to the road surface $\mu$) which is appropriate to minimize the braking distance at the time and is finally converged thereto. X1 is set such that, when Bpa is small (low $\mu$), its variation is slow and, when it is large (high $\mu$), its variation is relatively quick. The reason is that a large hydraulic pressure variation is not required when Bpa is small because a quick hydraulic pressure variation tends to result in excessive control.

Thereafter, control goes to steps 304 and 305 so as to check whether the reference control hydraulic pressure Bpa is successively below a predetermined value (for example, 10 kg/cm²) for a predetermined time period (for example, 1 second) with respect to the left and right driven-wheels. If so, control goes to a step 311 to terminate the braking traction control (BTC). Otherwise, control goes to a step 306 to calculate left and right driven-wheel target control hydraulic pressures Pyo. Each target control hydraulic pressure Pyo is derived from the reference control hydraulic pressure Bpa and the wheel state parameter Wpa as expressed by the following equation.

$$Pyo = Bpa + X2 \cdot Wpa$$

where X2 is a coefficient and obtained as $k4 \cdot Bpa + k5$ (k4 and k5 are constants).

The coefficient X2 is proportional to the reference control hydraulic pressure Bpa and X2 becomes small when Bpa is small so as to control the variation component of Pyo to prevent the excessive control.

Here, since the reference control hydraulic pressure Bpa is calculated on the basis of the previously obtained value, it is slowly varied with respect to the left and right wheel speed behaviors, and is a parameter which is converged to a hydraulic pressure which is estimated to be appropriate, that is, a braking hydraulic pressure appropriately corresponding to the road surface $\mu$. On the other hand, the target control hydraulic pressure Pyo is a parameter for quickly coping with the behaviors of the left and right wheel speeds on the basis of the reference control hydraulic pressure Bpa so as to take a countermeasure against the rapid variations of the wheel speed and the road surface $\mu$.

After independently calculating the target control hydraulic pressures Pyo with respect to the left and right driven-wheels in the step 306, the program proceeds to a step 307 where final target hydraulic pressures Py are obtained by corrections of both the target control hydraulic pressures Pyo by taking the relation therebetween. That is, the left and right wheel target control hydraulic pressures Pyo are different from each other when the left wheel is different in terms of the road surface $\mu$ from the right wheel. However, the situation that the braking hydraulic pressures for the left and right wheels are greatly different from each other is not preferable because a great load can be applied to the differential system of the motor vehicle. Therefore, in the step 307, the difference between the left and right wheel final target hydraulic pressures Py is limited up to 10 kg/cm², for example. More specifically, each of the final target hydraulic pressures Py for each of the left and right wheels is determined to a greater one of its own Pyo and a value obtained by subtracting 10 from the other wheel Pyo, that is, Pyr (for right wheel)=MAX [Pyor, Pyol−10]

Pyl (for left wheel)=MAX [Pyol, Pyor−10]

The program proceeds from the step 307 to a step 308 to calculate a duty ratio D with respect to the braking actuator for each of the left and right wheels on the basis of the final target hydraulic pressures Py, followed by a step 309 to drive the braking actuators in accordance with the results in the step 308. After the execution of the step 309, the BTC routine is terminated.

Figure 7:
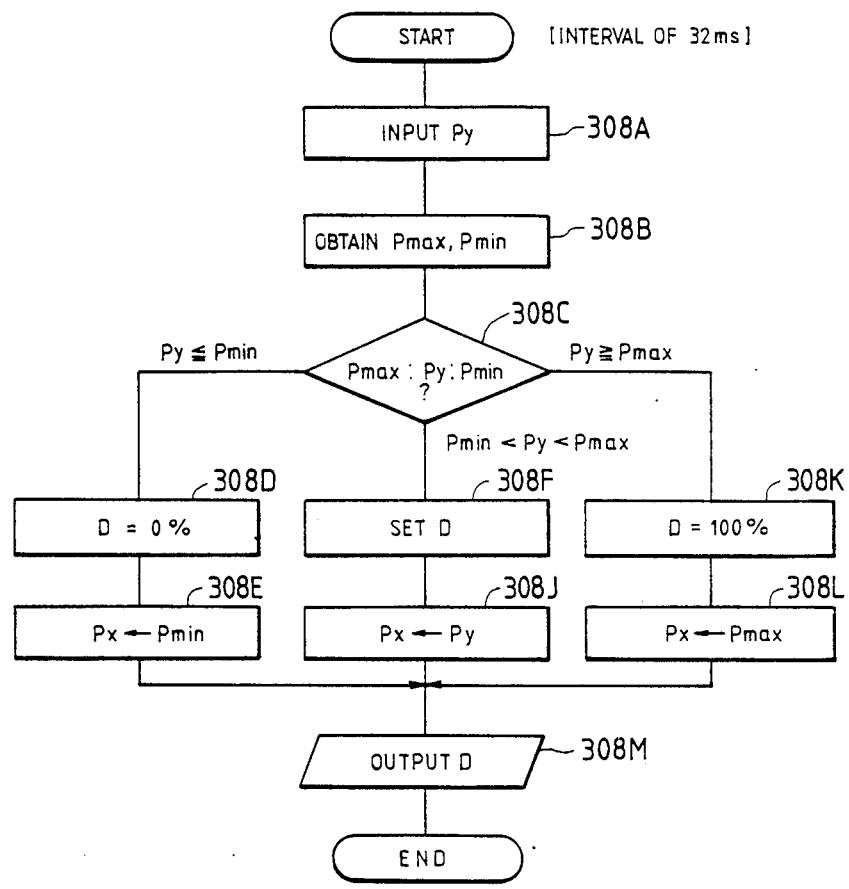
FIG. 7 is a flow chart showing calculation of the output duty ratio.

The output duty calculation in the step 308 of FIG. 6 will be described in detail with reference to a routine of FIG. 7. In FIG. 7, the final target hydraulic pressure Py is inputted in a step 308A, followed by a step 308B to obtain values Pmax, Pmin from the present estimation hydraulic pressure value Px, which will be described hereinafter. The value Pmax is a hydraulic pressure value which is obtained at the time of elapse of the control period by pressure-increasing from Px under the 100% duty ratio control (only pressure-increasing command), and the value Pmin is a hydraulic pressure value which is obtained by pressure-decreasing from Px under the 0% duty ratio control (only pressure-decreasing command). The pressure-increasing and pressure-decreasing amounts are determined in advance in accordance with the pressure-increasing system and pressure-decreasing system of the braking device.

Control goes to a step 308C where the final target hydraulic pressure Py is compared in magnitude with values Pmax and Pmin. If Py≦Pmin, control goes to steps 308D and 308E to set the duty ratio to 0% and determine this Pmin as a brake estimation hydraulic pressure value Px. If Py≧Pmax, control proceeds to steps 308K and 308L so as to set the duty ratio to 100% and determine this Pmax as the estimation hydraulic pressure value Px. Furthermore, If Pmin<Py<Pmax, control goes to steps 308F and 308J where the duty ratio D is obtained in accordance with a map representing the relation among the final target hydraulic pressure Py, estimation hydraulic pressure Px and duty ratio and further the target hydraulic pressure Py is set as the estimation hydraulic pressure Px.

Figure 8:
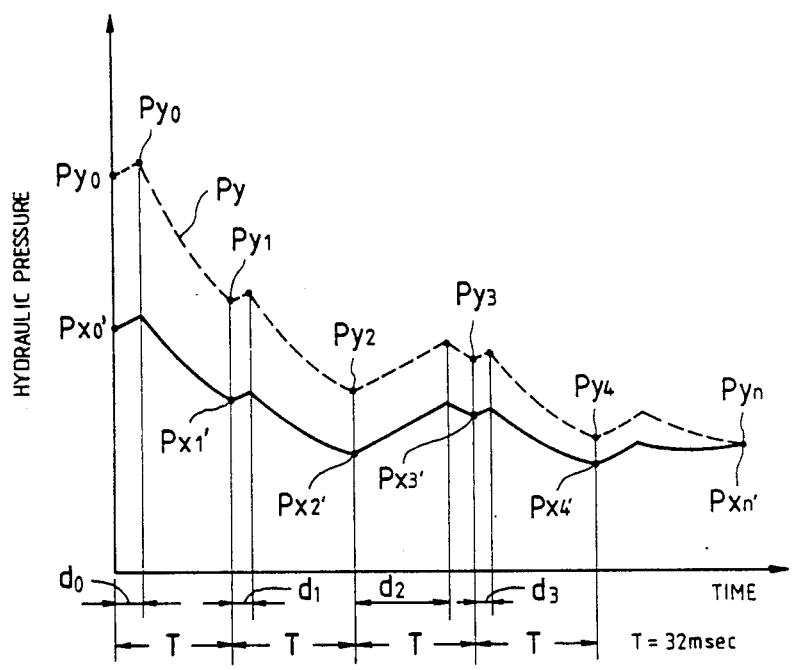
FIG. 8 is a graphic illustration for understanding the FIG. 7 flow chart.

Here, the reason that Py is set to Px will be described hereinbelow with reference to FIG. 8 showing the target hydraulic pressure Py and the actual hydraulic pressure P'x at every control period T. The hydraulic pressure control is performed so as to output duty ratios (pressure-increasing time of the period T) d1, d2, d3 . . . dn for the outputs of the target hydraulic pressures Py0, Py1, Py2, Py3, Py4 . . . Pyn. At this time, the actual hydraulic pressures assume Px1', Px2' Px3'. The pressure-increasing is made linearly by the pump characteristic and the pressure-decreasing is made exponentially due to the oil viscosity and so on. Therefore, even if the target hydraulic pressure Pyo is different from the actual hydraulic pressure Pxo' at the initial time, the difference therebetween is reduced at every control execution so that Pyn=Pxn' finally. From this, it will be understood that it is possible to set the target hydraulic pressure Py to the brake estimation hydraulic pressure Px. This means that it is possible to accurately estimate the braking hydraulic pressure irrespective of no provision of a hydraulic pressure sensor for detecting the braking hydraulic pressure value. Furthermore, when taking into account the fact that the final target hydraulic pressure Py accurately corresponds to the actual hydraulic pressure Px' and the final target hydraulic pressure Py is obtained on the basis of the reference control hydraulic pressure Bpa, the reference control hydraulic pressure Bpa also results in corresponding to the actual braking hydraulic pressure Px'.

Figure 9:
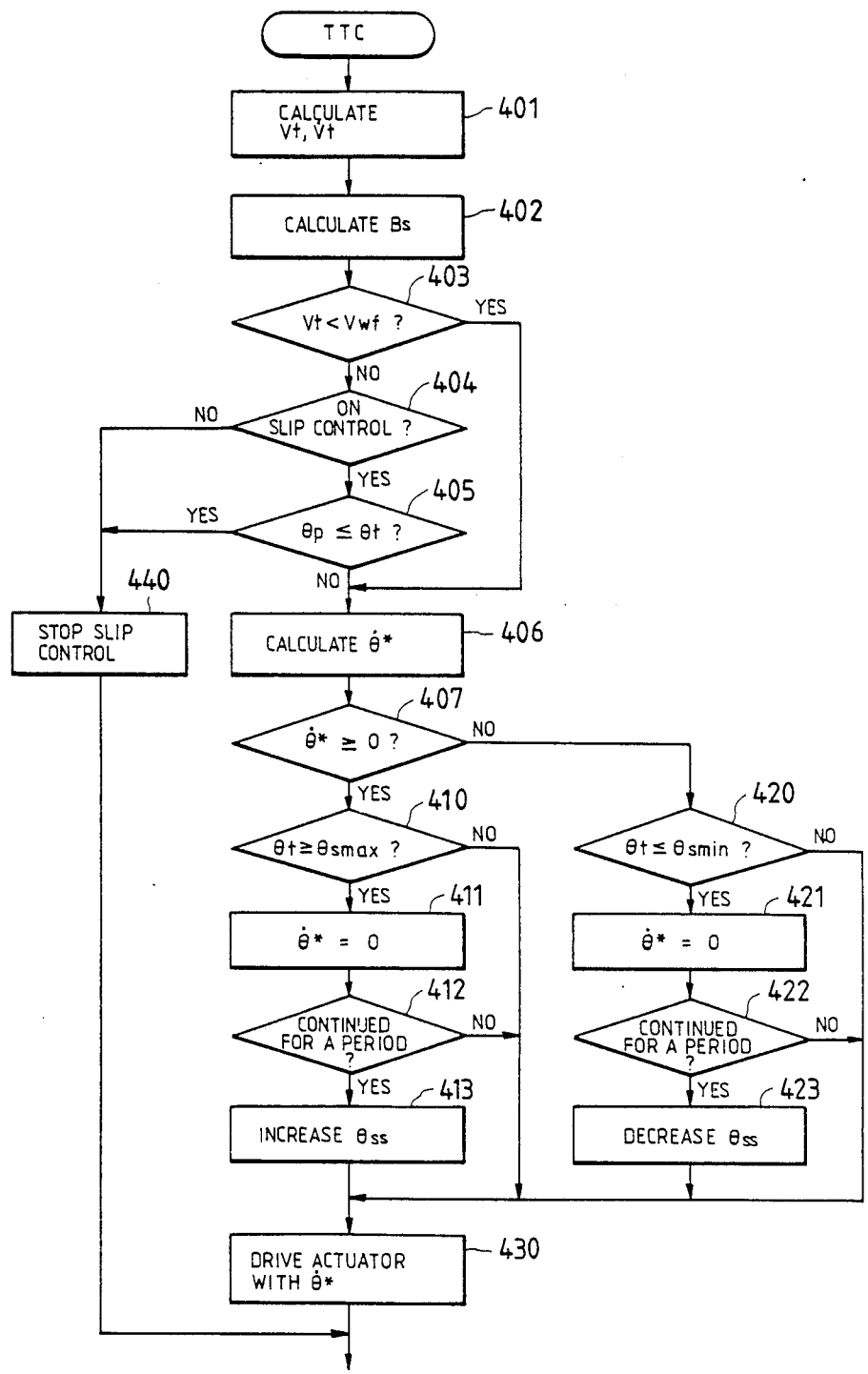
FIG. 9 is a flow chart showing the throttle traction control.

FIG. 9 shows processes of the throttle traction control (TTC) executed in the step 400 of the FIG. 4 main routine.

A step 401 is provided to calculate a target speed Vt and an acceleration value $\dot{V}t$ corresponding thereto. The target speed Vt is determined in correspondence with a predetermined slip ratio, that is, it is obtained in accordance with the following equation using the driven-wheel speed Vwfo in the case of no occurrence of slipping:

$$Vt = K \cdot Vwfo + Vo$$

where K is a constant which is 1.1 to 2.0 and Vo is a predetermined speed which is 1 to 20 km/h and which is added for prevention of error-operation due to low-speed running and so on.

Furthermore, the target acceleration value $\dot{V}t$ is calculated as $\dot{V}t = k \cdot \dot{V}wfo$.

The program proceeds to a step 402 to calculate a throttle reference opening degree θs. The throttle reference opening degree θs is a throttle opening degree used as a reference on the slip control and is calculated in accordance with the following equation (4-1):

$$\theta s = B1 \cdot \dot{V}wfo + B2 \cdot (Vt - Vwf) + B3 \cdot Vwfo + \theta ss - B4 \cdot (Bpar + Bpal) + \theta sd \quad (4\text{-}1)$$

where θsd=θsd+B5·(Vt−Vwf)+B6 . . . (4-2) and B1, B2, B3, B4, B5, B6 are constants (>0) and θss is a learning correction term which is varied in control and whose initial value is expressed by θsso.

In the equation (4-1), B1·$\dot{V}$wfo is a term corresponding to the road surface friction coefficient, B2·(Vt−Vwf) is a term for correction of the first-mentioned term in accordance with the difference between the target speed Vt and the driven-wheel speed Vwf, and B3·Vwfo is a term for varying the reference opening degree θs in accordance with the wheel speed Vwfo so as to keep the engine torque to a constant value. Furthermore, in the same equation, B4·(Bpar+Bpal) is a term for reducing the reference opening degree θs by a value corresponding to each of the left and right reference control hydraulic pressures Bpa, and θsd, as will be understood from the equation (4-2), is a term which is varied relatively slowly in correspondence with the difference between the target speed Vt and left/right driven-wheel average speed Vwf at the initial value B6, it becoming small under the condition that Vwf continuously exceeds Vt, that is, when an excessive torque generates, and it becoming large under the condition that Vwf is continuously below Vt, that is, when the torque is insuffcient, whereby the reference opening degree θs is successively corrected.

Control then advances to a step 403 to check whether or not the driven-wheel slip occurs. Here, the decision is made by comparing the driven-wheel speed Vwf in the step 102 of the FIG. 4 main routine with the target speed Vt in the step 401 in this routine. That is, the occurrence of the drive-wheel slip is determined when Vt<Vwf. If so, control jumps to a step 406. On the other hand, if not, the step 403 is followed by a step 404. In the step 404, it is checked whether the slip control is on operation. If the decision is "NO", the step 404 is followed by a step 440. If the decision is "YES", control goes to a step 405 where the throttle opening degree $\theta t$ is compared with the acceleration-pedal operating amount $\theta p$. When $\theta p \leq \theta t$, control goes to the step 440 for termination of the driven-wheel slip control. Here, in theory, the slip control should be terminated when both become equal to each other. However, in practice, $\theta t = \theta p$ is extremely rare. Therefore, in this embodiment, the decision is made by $\theta t \geq \theta p$ so as to cover the actual situation.

On the other hand, if the throttle opening degree $\theta t$ is not coincident with the acceleration-pedal operating amount $\theta p$, that is, $\theta t < \theta p$ in the step 405, control goes to the step 406 in order to continue the slip control. In the step 406, a target throttle opening and closing speed $\dot{\theta}^*$ is calculated in accordance with the following equation (4-3):

$$\dot{\theta}^* = A1 \cdot (Vt - Vwf) + A2 \cdot (\dot{V}t - \dot{V}wf) - A3 \cdot (Bpar + Bpal) \quad (4-3)$$

where A1, A2, A3 are constants (>0).

In the equation (4-3), $A3 \cdot (Bpar + Bpal)$ is a term which directs the target throttle opening and closing speed $\dot{\theta}^*$ in the negative (closing) direction in proportion to the sum of the left and right braking reference control hydraulic pressures Bpar, Bpal. That is, when the braking hydraulic pressure is large, it is determined that the engine torque is excessive and the throttle closing speed is increased in accordance with the magnitude of the braking hydraulic pressure.

Control then goes to a step 407 to check whether the target throttle opening and closing speed $\dot{\theta}^*$ is positive or negative. "positive" means the throttle valve opening direction and "negative" means the closing direction. In the step 407, if $\dot{\theta}^* \geq 0$, control goes to a step 410. If not, control goes to a step 420. In the step 410, the throttle opening degree $\theta t$ is compared with a maximum allowable opening degree $\theta smax$ (= $\theta s + 5\%$) for the reference opening degree $\theta s$ obtained in the step 402. If $\theta t < \theta smax$, control jumps to a step 430. On the other hand, if $\theta t \geq \theta smax$, the step 410 is followed by a step 411 to set the target throttle opening and closing speed $\dot{\theta}^*$ to zero to restrict the throttle opening and closing control, then followed by a step 412. In the step 412, it is checked whether the condition of $\dot{\theta}^* \geq 0$ and $\theta t > \theta smax$ is kept for a predetermined time period (for example, 0.1 to 5 sec.). If the answer of the step 412 is "NO", control goes to the step 430. On the other hand, if the answer is "YES", control goes to a step 413. In this case, the reference opening degree $\theta s$ in the step 402 is smaller than the desired throttle opening degree. Therefore, in the step 413, the throttle opening degree learning correction term $\theta ss$ in the equation (4-1) is increased so as to correct the reference opening degree $\theta s$. Thereafter, the step 413 is followed by the step 430.

On the other hand, in the case of the step 407 being followed by the step 420, in the step 420, the throttle opening degree $\theta t$ is compared with a minimum allowable opening degree $\theta smin$ (= $\theta s - 5\%$). Here, if $\theta t > \theta smin$, control jumps to the step 430. On the other hand, if $\theta t \leq \theta smin$, control goes to a step 421 to restrict the throttle opening and closing control by setting the target throttle opening and closing speed $\dot{\theta}^*$ to zero, followed by a step 422. In the step 422, the decision is made in terms of whether the state that $\dot{\theta}^* < 0$ and $\theta t \leq \theta smin$ is kept for a predetermined time period (for example, 0.1 to 5 sec.). If the answer is "NO", control goes to the step 430. On the other hand, if the answer is "YES", the step 422 is followed by a step 423. In this case, the reference opening degree $\theta s$ in the step 402 exceeds a desired throttle opening degree. Thus, in the step 423, the learning correction term $\theta ss$ in the equation (4-1) is decreased so as to correct the reference opening degree $\theta s$, then followed by the step 430. In the step 430, the electronic control unit 17 generates a control signal and energizes the throttle actuator SVA1 so that the opening and closing speed of the throttle valve SV1 becomes equal to the target throttle opening and closing speed $\dot{\theta}^*$ in the steps 406, 411 and 421. Here, in the case of $\dot{\theta}^* > 0$, the throttle actuator SVA1 causes the throttle valve SV1 to be driven in the opening direction at the speed $|\dot{\theta}^*|$. If $\dot{\theta}^* < 0$, the throttle actuator SVA1 causes the throttle valve SV1 to be driven in the closing direction at the same speed.

On the other hand, in the case of execution of the step 440 for the termination of the slip control, the electronic control unit 17 operates the throttle actuator SVA1 so that the throttle opening degree $\theta t$ always corresponds to the acceleration-pedal operating amount $\theta p$.

With the above-mentioned processes, although the opening and closing operation of the throttle valve SV1 on the slip control is basically performed at the target throttle opening and closing speed $\dot{\theta}^*$, obtained in the equation (4-3), it is allowed to inhibit only when the throttle valve SV1 is driven in the direction away from the reference opening degree $\theta s$.

Figure 10A:
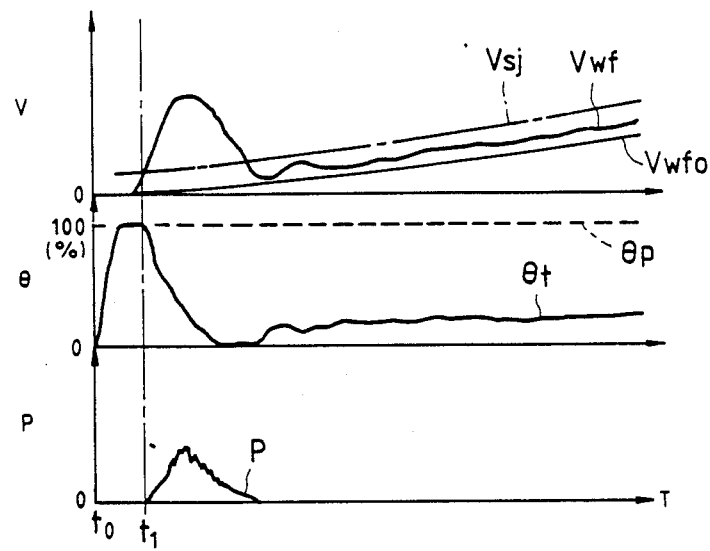
FIGS. 10A and 10B are graphic illustrations for further describing the throttle traction, control of FIG. 9.
Figure 10B:
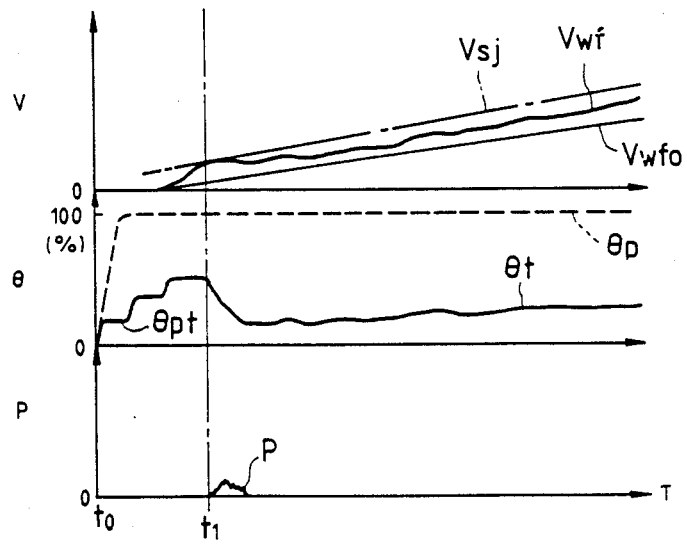

A further description in terms of the preventive traction control (PTC) will be described hereinbelow with reference to FIGS. 10A and 10B. FIG. 10A shows the control waveforms in the case of no execution of the PTC and FIG. 10B shows the control waveforms in the case of the execution of the PTC. Here, the motor vehicle is started under the condition that the road surface $\mu$ is low. In FIGS. 10A and 10B, the reference Vwf represents the speed of one driven-wheel, Vwfo designates the speed of the wheel in the case of no slipping, $\theta p$ is the operating amount of the acceleration-pedal AP1, $\theta t$ depicts the opening degree of the throttle valve SV1, P represents the braking hydraulic pressure for the wheel, and T is the elapse of time.

When at the time t0 the vehicle driver operates the acceleration-pedal AP1 up to a maximum, in the case of no execution of the PTC (FIG. 10A), the throttle valve SV1 becomes in the full-opened state so that the engine generates a large torque at a stretch. Therefore, the driven-wheel quickly exceeds the gripping limit and hence the slip control is started over the control start decision speed when T=t1 (Vw>Vsj). However, since at this time the increase of the wheel speed Vw is extremely rapid, difficulty is encountered in preventing the initially great reacting of a driven-wheel irrespective of quick closing of the throttle valve SV1 and a quick application of the braking hydraulic pressure thereto. Generally, the suppression of the wheel racing by the braking is not preferred because of generation of the vehicle vibration and application of a large load to the driving force transmission system and so on. Thus, it is preferable to perform the PTC as shown in FIG. 10B. In FIG. 10B, in response to operation of the acceleration-pedal AP1 at the time t0, the electronic control unit 17 detects this acceleration-pedal operation by means of the acceleration-pedal operating amount sensor APS1 and starts the PTC. The electronic control unit 17 increases the target throttle opening degree $\theta$pt stepwise at a predetermined appropriate speed. When the acceleration-pedal opening amount $\theta$p exceeds the target throttle opening degree $\theta$pt, the throttle opening degree $\theta$t is limited to the target throttle opening degree $\theta$pt and therefore the throttle opening degree $\theta$t is increased stepwise in accordance with target throttle opening degree $\theta$pt. Thus, the engine torque is gradually increased and the slip occurs when the driven-wheel torque exceeds the gripping force at a time. When at the time t1 the wheel speed Vw exceeds the control start decision speed Vsj, the above-described BTC and TTC start. At this time, since the driven-wheel torque is slowly increased and the increase of the driven-wheel speed on occurrence of the slipping is relatively slow, it is possible to sufficiently reduce the initial driven-wheel racing by quickly decreasing operation of the throttle opening degree and generation of the braking hydraulic pressure which are caused by the TTC and BTC. Furthermore, since the braking is achieved with a relatively low hydraulic pressure, it is possible to sufficiently reduce the vehicle vibration and so on.

Although in this embodiment the PTC target opening degree $\theta$pt is appropriately determined in advance, it is also appropriate that the driven-wheel torque is detected on the basis of the engine speed, throttle opening degree, transmission system state, a signal from a torque sensor or the like, and the PTC target throttle opening degree is determined under the feedback control. It is also suitable to determine the execution of PTC by the vehicle driver.

Figure 11:
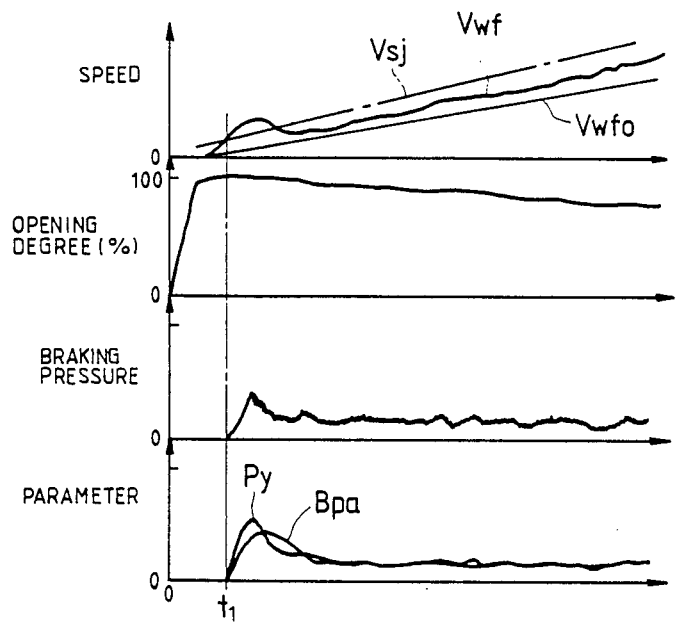
FIG. 11 is a graphic illustration for describing a conventional slip control.

A description of the above-mentioned BTC and TTC will be made hereinbelow by comparison with a conventional technique with reference to FIGS. 11 and 12. FIG. 11 is a graphic illustration for describing the conventional technique which is adapted to independently control the throttle operation and the braking operation, and FIG. 12 is a graphic illustration for describing this embodiment in which the throttle valve is controlled to be closed by the amount corresponding to the braking amount in accordance with the relation between the throttle valve opening degree and the braking hydraulic pressure.

In FIG. 11, when the acceleration slip occurs at the time t1, the braking hydraulic pressure is applied so as to control the driven-wheel speed Vwf. However, because the acceleration slip is substantially suppressed by only the braking pressure application, while the opening degree of the throttle valve is slightly decreased, the engine torque on the slip occurrence is maintained substantially. That is, regardless of presence of an excessive engine output, the engine output is not suppressed and the slip is restricted by only the braking, and therefore a large load is undesirably applied to the engine and braking system.

Figure 12:
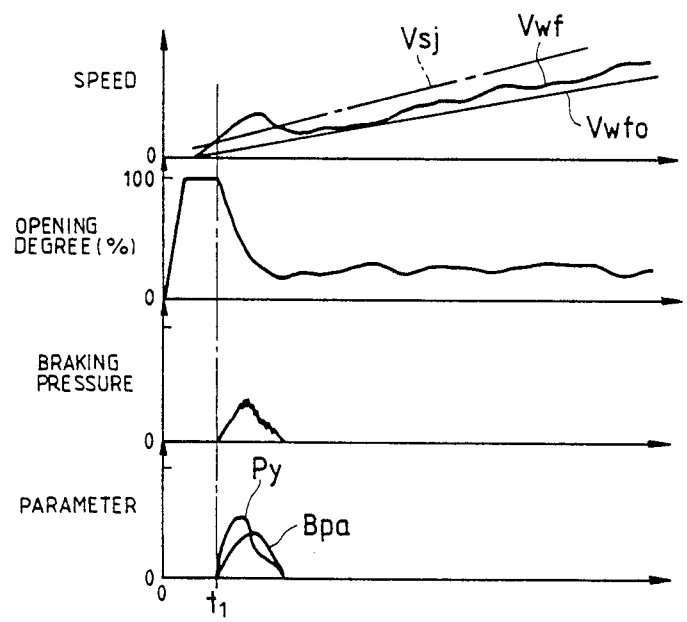
FIG. 12 is a graphic illustration for describing the slip control of this embodiment.

On the other hand, in FIG. 12, when the driven-wheel speed Vwf exceeds the slip decision speed Vsj, the above-described BTC and TTC start, whereby the braking hydraulic pressure is controlled on the basis of an appropriate final target hydraulic pressure Py and an excessive engine torque corresponding to the reference control hydraulic pressure Bpa is obtained and the throttle valve opening degree is appropriately decreased in correspondance with the obtained excessive engine torque, thus resulting in suppression of the excessive engine torque and driven-wheel torque so as to reduce the acceleration slip and quickly decrease the braking hydraulic pressure. Since the slip is quickly restricted by an appropriate braking hydraulic pressure on the occurrence of acceleration slipping and the excessive engine torque is also restricted in correspondance with the braking hydraulic pressure, after the slip is once restricted by the braking, an appropriate slip prevention can be made by only the throttle valve control.

As illustrated in FIGS. 11 and 12, the calculated reference control hydraulic pressure Bpa and the actual braking hydraulic pressure are substantially coincident with each other. Thus, in this embodiment, the TTC is performed on the basis of the reference control hydraulic pressure Bpa without using a braking pressure sensor. However, if required, it is allowed to perform the TTC on the basis of a pressure signal from the braking pressure sensor.

It should be understood that the foregoing relates to only a preferred embodiment of the present invention, and that it is intended to cover all changes and modifications of the embodiment of this invention herein used for the purposes of the disclosure, which do not constitute departures from the spirit and scope of the invention.

What is claimed is:

1. A wheel slip control apparatus for use in a motor vehicle including engine-output regulating actuator means for regulating the output of an internal combustion engine mounted on said vehicle and braking force regulating actuator means for regulating a braking force to be applied to at least one driven-wheel of said vehicle, comprising:

speed deriving means for deriving a rotational speed of said driven-wheel;

acceleration-slip detecting means for detecting the occurrence of acceleration-slip of said driven-wheel on the basis of at least the rotational speed of said driven-wheel derived by said speed deriving means and generating a signal indicative of the acceleration-slip;

brake calculation means responsive to the acceleration-slip signal for calculating a reference control value of a braking force to be applied to said driven-wheel on the basis of a parameter representing a state of said driven-wheel and an operation amount of said engine-output regulating actuator means representing the output of said engine so as to suppress the acceleration-slip and for supplying a brake control signal indicative of the calculated braking-force reference control value to said braking force regulating actuator means so as to control the braking force applied to said driven-wheel in accordance with the calculated braking-force reference control value; and engine output calculation means responsive to the brake control signal from said brake calculation means for calculating an engine output control amount on the basis of the braking-force reference control value calculated in said brake calculation means and for supplying an engine-output control signal indicative of the calculated engine output control amount to said engine-output regulating actuator means so as to decrease the engine output by a value corresponding to the calculated braking-force reference control value.

2. A wheel slip control apparatus as claimed in claim 1, wherein said driven-wheel state parameter is derived as a function of the driven-wheel rotational speed.

3. A wheel slip control apparatus as claimed in claim 1, wherein said reference control value is obtained in accordance with a condition of road surface on which said vehicle is running.

4. A wheel slip control apparatus as claimed in claim 1, wherein said reference control value is determined so as to decrease as the operation amount of said engine-output regulating actuator means decreases.

5. A wheel slip control apparatus as claimed in claim 1, wherein said engine-output regulating actuator means operates a throttle valve of said vehicle to regulate the output of said engine.

6. A wheel slip control apparatus as claimed in claim 5, wherein said engine output calculation means calculates a reference opening degree of said throttle valve and performs the engine output control on the basis of the calculated reference opening degree, said reference opening degree being calculated as a function of the braking-force reference control value.

7. A wheel slip control apparatus as claimed in claim 5, wherein said engine output calculation means calculates a target operating speed of said throttle valve on the basis of the braking-force reference control value so as to control said throttle valve with the calculated target operating speed.

8. A wheel slip control apparatus for use in a motor vehicle, comprising:

engine-output regulating actuator means for regulating an output of an internal combustion engine mounted on said vehicle, said engine-output regulating actuator means including a throttle valve of said engine;

braking force regulating actuator means for regulating braking forces to be applied to wheels of said vehicle;

first wheel-speed detecting means for detecting rotational speeds of driven wheels of said wheels of said motor vehicle and for generating first detection signals indicative of the detected rotational speeds of the driven wheels;

second wheel-speed detecting means for detecting rotational speeds of non-driven wheels of said wheels of said motor vehicle and for generating second detection signals indicative of the detected rotational speeds of the non-driven wheels;

throttle detecting means for detecting an opening degree of said throttle valve and for generating a signal indicative of the detected throttle opening degree; and electronic control means responsive to said first and second detection signals and said throttle opening signal for controlling said engine-output regulating actuator means and said braking force regulating actuator means, said electronic control means including:

first means for calculating wheel speeds and wheel accelerations on the basis of said first and second detection signals;

second means for calculating wheel speeds of said driven wheels under a condition of no occurrence of slipping on the basis of said second detection signals to obtain an average value of the driven-wheel speeds and an acceleration corresponding to the average value;

third means for calculating a speed and acceleration of said motor vehicle on the basis of said first and second detection signals;

fourth means for determining a slip reference speed on the basis of said second detection signals under a condition of no slip;

fifth means for comparing the determined slip reference speed with said average value of the obtained driven-wheel speeds;

sixth means for determining a target throttle opening degree when the determined reference speed is greater than the average value of the obtained driven-wheel speeds;

seventh means for comparing the determined target throttle opening degree with a value corresponding to an operation amount of an acceleration-pedal of said motor vehicle;

eighth means for operating said engine-output regulating actuator means when the value corresponding to the operation amount of said acceleration-pedal is greater than the target throttle opening degree, so that the throttle opening degree of said throttle valve becomes equal to the target throttle opening degree;

ninth means for calculating a reference control value for the braking of said driven wheels when the determined reference speed is smaller than the average value of the obtained driven-wheel speeds so as to control said braking force regulating actuator means in accordance with the calculated reference control value; and tenth means for calculating an engine output control amount on the basis of the calculated reference control value and for controlling engine-output regulating actuator means in accordance with the calculated engine output control amount so as to decrease the engine output by a value corresponding to the calculated reference control value.

9. A wheel slip control apparatus as claimed in claim 8, wherein said ninth means terminates the control of braking when said reference control value is successively below a predetermined value for a predetermined time period.

10. A wheel slip control apparatus as claimed in claim 8, wherein said ninth means, when said reference control value is not below a predetermined value for a predetermined time period, determines target braking forces for said driven wheels and corrects the determined target braking forces to limit the difference between the determined target braking forces to a predetermined value, and controls said braking force regulating actuator means on the basis of the corrected target braking forces.

11. A wheel slip control apparatus as claimed in claim 8, wherein said tenth means calculated a target throttle operating speed on the basis of the wheel speeds and accelerations of said driven wheels when the throttle opening degree is not coincident with the acceleration-pedal operation amount, and controls said engine-output regulating actuator means so that the operating speed of said throttle valve becomes equal to the target throttle operating speed when the throttle opening degree is in a predetermined range.

12. A wheel slip control apparatus as claimed in claim 8, wherein said electronic control means, when said vehicle is in a braking state, performs anti-skid control by controlling said braking force regulating actuator means.

13. A wheel slip control apparatus as claimed in claim 11, wherein said target throttle operating speed $\dot{\theta}*$ is obtained in accordance with the following equation:

$$\dot{\theta}* = A1 \cdot (Vt - Vwf) + A2 \cdot (\dot{V}t - \dot{V}wf) - A3 \cdot (Bpar + Bpal)$$

where A1, A2 and A3 are constants, Vt represents a target speed, $\dot{V}$t designates a target acceleration value, Vwf is a driven-wheel speed, $\dot{V}$wf depicts an acceleration value of the driven wheel, and Bpar and Bpal represent reference control values.

14. A wheel slip control apparatus for use in a motor vehicle, comprising:

engine-output regulating actuator means for regulating an output of an internal combustion engine mounted on said vehicle by operating a throttle valve of said engine;

braking force regulating actuator means for regulating a braking force of said vehicle;

first wheel-speed detecting means for detecting rotational speeds of driven wheels of said motor vehicle and for generating first detection signals indicative of the detected rotational speeds of the driven wheels;

second wheel-speed detecting means for detecting rotational speeds of non-driven wheels thereof and for generating second detection signals indicative of the detected rotational speeds of said non-driven wheels;

throttle detecting means for detecting an opening degree of said throttle valve and for generating a signal indicative of the detected throttle opening degree; and electronic control means responsive to said first and second detection signals and said throttle opening signal for controlling said engine-output regulating actuator means and said braking force regulating actuator means, said electronic control means including:

means for calculating wheel accelerations on the basis of said first and second detection signals;

means for calculating wheel speeds of said driven wheels under a condition of no occurrence of slipping on the basis of said second detection signals to obtain an average value of the driven-wheel speeds and an acceleration corresponding to the average value;

means for calculating speed and acceleration of said motor vehicle on the basis of said first and second detection signals;

means for determining a slip reference speed on the basis of said second detection signals under a condition of no slip;

means for comparing the determined target throttle opening degree with a value corresponding to an operation amount of an acceleration-pedal of said motor vehicle;

means for operating said engine-output regulating actuator means when the value corresponding to the operation amount of said acceleration-pedal is greater than the target throttle opening degree, so that the throttle opening degree of said throttle valve becomes equal to the target throttle opening degree;

means for calculating a reference control value for the braking of said driven wheels when the determined reference speed is smaller than the average value of the obtained driven-wheel speeds so as to control said braking force regulating actuator means in accordance with the calculated reference control value; and means for calculating an engine output control amount on the basis of the calculated reference control value and for controlling engine-output regulating actuator means in accordance with the calculated engine output control amount so as to decrease the engine output by a value corresponding to the calculated reference control value.

* * * * *